April 13, 1948.   B. H. GAUL   2,439,510
CONNECTING MEANS
Filed March 29, 1946   2 Sheets-Sheet 1
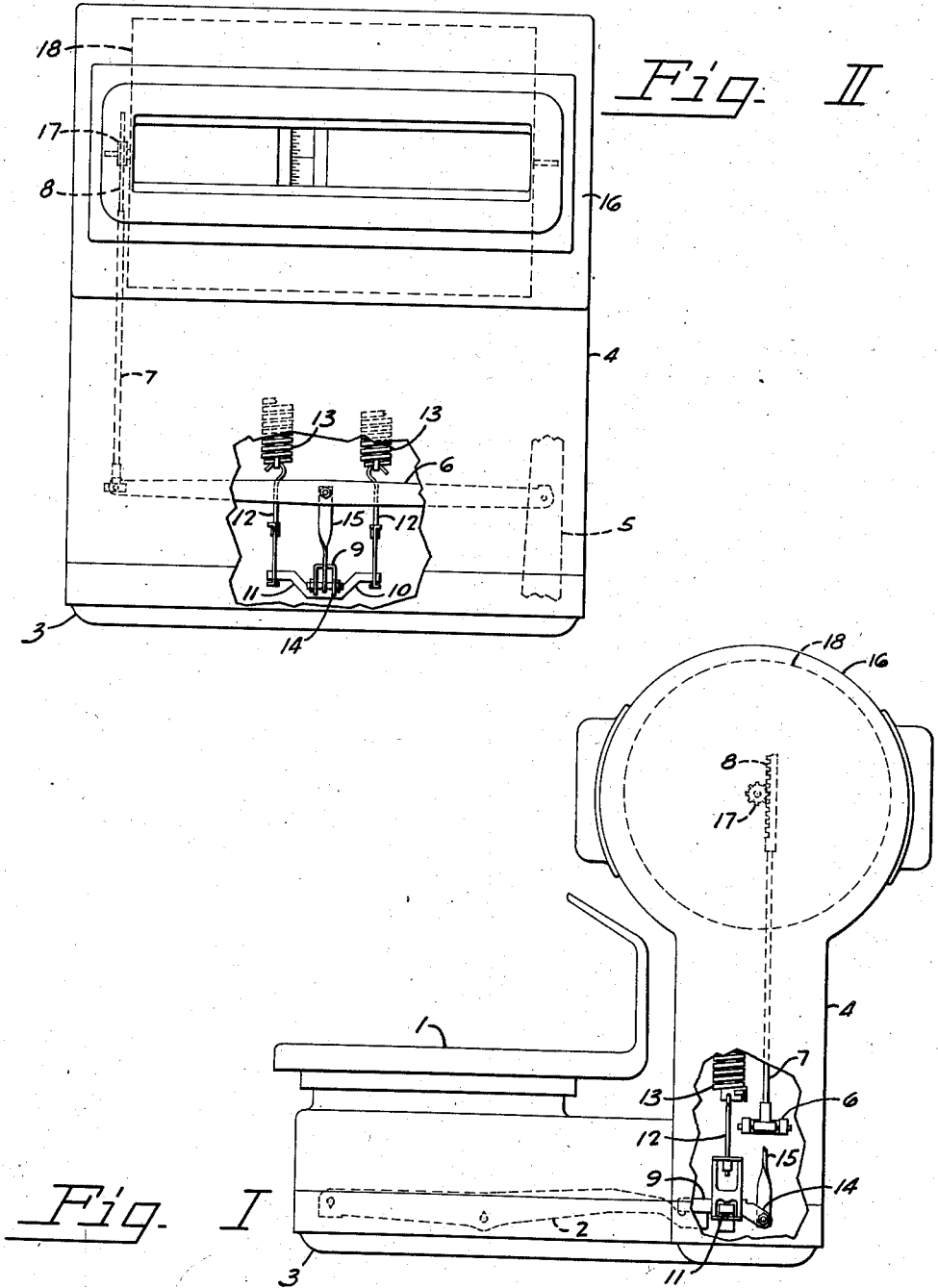
INVENTOR.
Blair H. Gaul
BY
Marshall and Marshall
ATTORNEYS April 13, 1948. B. H. GAUL 2,439,510
CONNECTING MEANS
Filed March 29, 1946 2 Sheets-Sheet 2
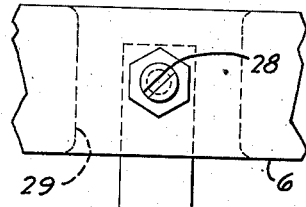
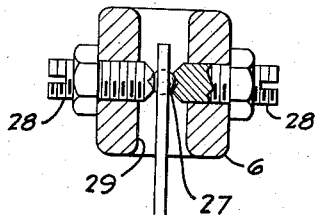
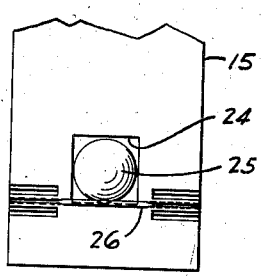
Fig. V
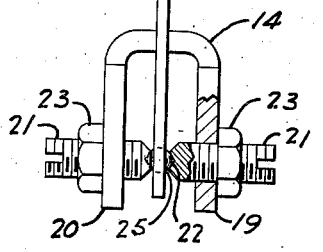
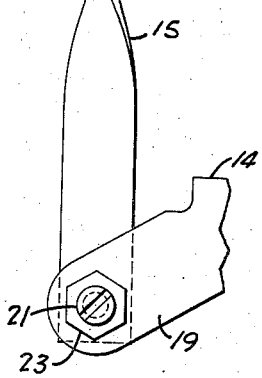
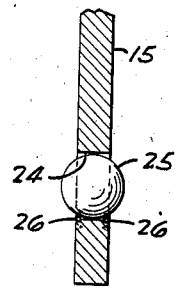
Fig. III  Fig. IV  Fig. VI
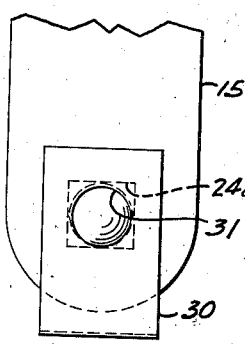
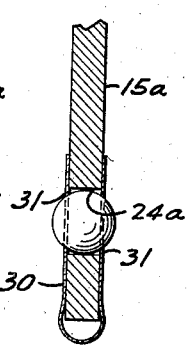
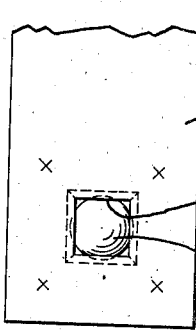
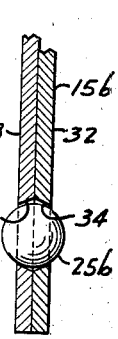
Fig. VII  Fig. VIII  Fig. IX  Fig. X
INVENTOR.
Blair H. Gaul
BY
Marshall and Marshall
ATTORNEYS Patented Apr. 13, 1948

2,439,510

UNITED STATES PATENT OFFICE 2,439,510

CONNECTING MEANS

Blair H. Gaul, Toledo, Ohio, assignor to Toledo Scale Company, Toledo, Ohio, a corporation of New Jersey Application March 29, 1946, Serial No. 658,356

4 Claims. (74—579)

This invention relates to connecting means and in particular to means for connecting levers movable in nonparallel planes.

In the construction of a weighing scale, for example, it is necessary to transmit force from the weight receiving portion of the scale to the force resisting members of the scale and also to indicating mechanism. Because of present trends in scale design it often is necessary to transmit such force by means of linked levers each of which move in an arcuate path, the planes of such movement being nonparallel and often lying in planes at right angles to each other. A direct linkage, i. e. a fixed connection between two levers of this type is impossible of course, because of the fact that at only one place in their movement do the two points to be connected lie in the same plane. A fixed connection, therefore, would be twisted when the levers swing away from this position and would introduce resistance into the lever system.

Various means of connecting levers to each other have been devised. Some of them are extremely complex involving stirrup-shaped members carrying bearings which ride on pivots fixed in the levers, but this design is not desirable since it is expensive and also since it is effective only when the force is in one direction. Simple connecting means have been designed which employ pins inserted into holes; the pins being carried by the linking means and fitting loosely into holes bored in the levers to be connected. This construction, while extremely cheap, is very undesirable due to the friction created by the twisting of the pins in the holes.

It is an object of this invention to provide a link for connecting two members movable in arcuate paths lying in different, nonparallel planes which is simple to construct, inexpensive to manufacture and creates almost no resistance in the force transmission system due to its being almost frictionless.

In the drawings:

Figure I is a view in end elevation of a weighing scale incorporating a link connecting means embodying the invention, certain parts being broken away and certain parts being shown in dotted lines.

Figure II is a view similar to Figure I but taken from the right side of Figure I.

Figure III is a greatly enlarged fragmentary detail view of a link embodying the invention.

Figure IV is a view similar to Figure III taken from the right side of Figure III.

Figure V is a still further enlarged fragmentary view of a portion of the link illustrated in Figures III and IV.

Figure VI is a fragmentary vertical sectional view taken on the center line of the link shown in Figure V.

Figure VII is a fragmentary view in elevation similar to Figure V but of a modification of the invention.

Figure VIII is a view similar to Figure VI but of the modification shown in Figure VII.

Figure IX is a view similar to Figure VII but of yet another modification of the invention.

Figure X is a view similar to Figure VIII but of the modification shown in Figure IX.

The weighing scale illustrated in Figure I has a load receiving platter 1 which is supported by linkage (not shown) on a main lever 2 fulcrumed within a base housing 3. An upright housing 4 is erected on the housing 3 at its rear and contains a pillar 5 on which is pivoted a lever 6 connected to a rod 7 on the upper end of which is secured a rack 8. An adjustable bracket 9 is secured on the end of the lever 2 which extends into the housing 4. The bracket 9 has two arms 10 and 11 (Figure II) extending laterally, to which are connected by means of hooks 12, a pair of force resisting springs 13. The bracket 9 also has a bifurcated arm 14 between the bifurcations of which there is mounted a link 15. The link 15 is connected to the lever 6.

The rack 8 extends upwardly into the interior of a chart housing 16 mounted atop the housing 4 where it is in mesh with a pinion 17 to rotate a cylindrical chart 18 within the housing 16.

Referring now to Figures III and IV the arm 14 of the bracket 9 has two bifurcations 19 and 20 through each of which there is threaded a set screw 21 having a cone-shaped socket 22 in its innermost end. The two set screws 21 are coaxial and adjustable relative to each other being fixed in adjusted position by nuts 23 which are tightened against the bifurcations 19 and 20. The link 15 is twisted 90° at approximately its midpoint, the lower end lying substantially in the same plane as that of the movement of the lever 2. A square aperture 24 is broached or otherwise cut through the body of the link 15 near its lowermost end and a hardened ball 25 of a diameter slightly smaller than the width of the square hole 24 is placed therein being held in position by two pins 26 one of which is staked on either side of the link 15 slightly overlapping the edge of the square hole 24 to retain the ball 25 therein. The ball 25 is grasped between the set screws 21 in their cone-socket ends.

The upper end of the link 15 is similarly constructed lying in the plane of movement of the lever 6 and connected thereto by means of a ball 27 held between the ends of two set screws 28 which are threaded through the wall portions of a slotted section 29 of the lever 6.

The fact that the link 15 is twisted and that each of its ends lies in the plane of the lever to which it is connected alone would not eliminate friction even if each of these ends were connected to its respective lever by a friction-free pivot and bearing for example, because the arcuate path of movement of the other end of the link would twist such pivotal connection out of line. The actual connections, therefore, must be "universal," that is, they must permit each end of the link to describe a circular path with respect to a line drawn between the connection points when the mechanism is stationary. The construction in Figures III, IV, V and VI freely permits this action since the ball is not held tightly between the set screws 21 or 23 and is not fitted tightly into the square holes 24 but is grasped only loosely so that it can rotate with a minimum of friction.

In Figures VII and VIII there is illustrated a ball retaining means comprising a resilient U-shaped clip 30 through the arms of which there are cut two circular holes 31 having a diameter slightly smaller than that of the ball retained thereby in a square hole 24a cut in the link 15a.

Another form of retaining means is illustrated in Figures IX and X where a link 15b is shown as constructed from two adjacent parallel plates 32 and 33 through which square pyramidically shaped holes 34 are cut. After a hardened steel ball 25b is placed in the holes 34 the plates 32 and 33 are secured to each other, for example by spot welding at the places indicated by the symbol "X."

The embodiments of the invention which have been disclosed are all designed to solve the problem of connecting two levers of certain specific characteristics but these or other forms of the invention are adapted to connect other levers of other characteristics and may be constructed to do so without departing from the fundamental scope of the invention.

Having described the invention, I claim:

1. Connecting means for transmitting power between two levers movable in nonparallel planes comprising a longitudinally extending link, said link being shaped so that one end thereof lies substantially in the plane of movement of one of said levers and the other end of said link lies substantially in the plane of movement of the other of said levers, said link having an aperture near each of its ends, a ball located in each of said apertures, means for nonrigidly retaining each of said balls in its aperture and means on each of said levers for grasping one of said balls.

2. Connecting means for transmitting power between two levers movable in nonparallel planes comprising a longitudinally extending link having a substantially square aperture in each of its ends, a ball located in each of said apertures, means for nonrigidly retaining each of said balls in its aperture and means on each of said levers for grasping one of said balls.

3. Connecting means for transmitting power between two levers movable in nonparallel planes comprising a longitudinally extending link having a substantially square aperture in each of its ends, a ball located in each of said apertures, means for nonrigidly retaining each of said balls in its aperture and a pair of oppositely directed, coaxial set screws located in each of said levers, said screws having cone-shaped sockets for loosely grasping one of said balls.

4. Connecting means for transmitting power between two levers movable in substantially the same direction but along arcuate paths lying in nonparallel planes comprising a longitudinally extending link having a transverse substantially square aperture in each end, said link being so shaped that each of its ends lies substantially in the plane of movement of that one of said levers to which it is to be connected, a ball located in each of said apertures, means for loosely retaining each of said balls in its aperture, and a pair of oppositely directed, coaxial screws mounted in each of said levers said screws having socketed inner ends for grasping one of said balls therebetween.

BLAIR H. GAUL.

REFERENCES CITED

The following references are of record in the file of this patent:

FOREIGN PATENTS

| Number | Country | Date |
|---|---|---|
| 524,550 | France | May 16, 1931 |
| 433,079 | Great Britain | Aug. 8, 1935 |